Patented Dec. 30, 1930

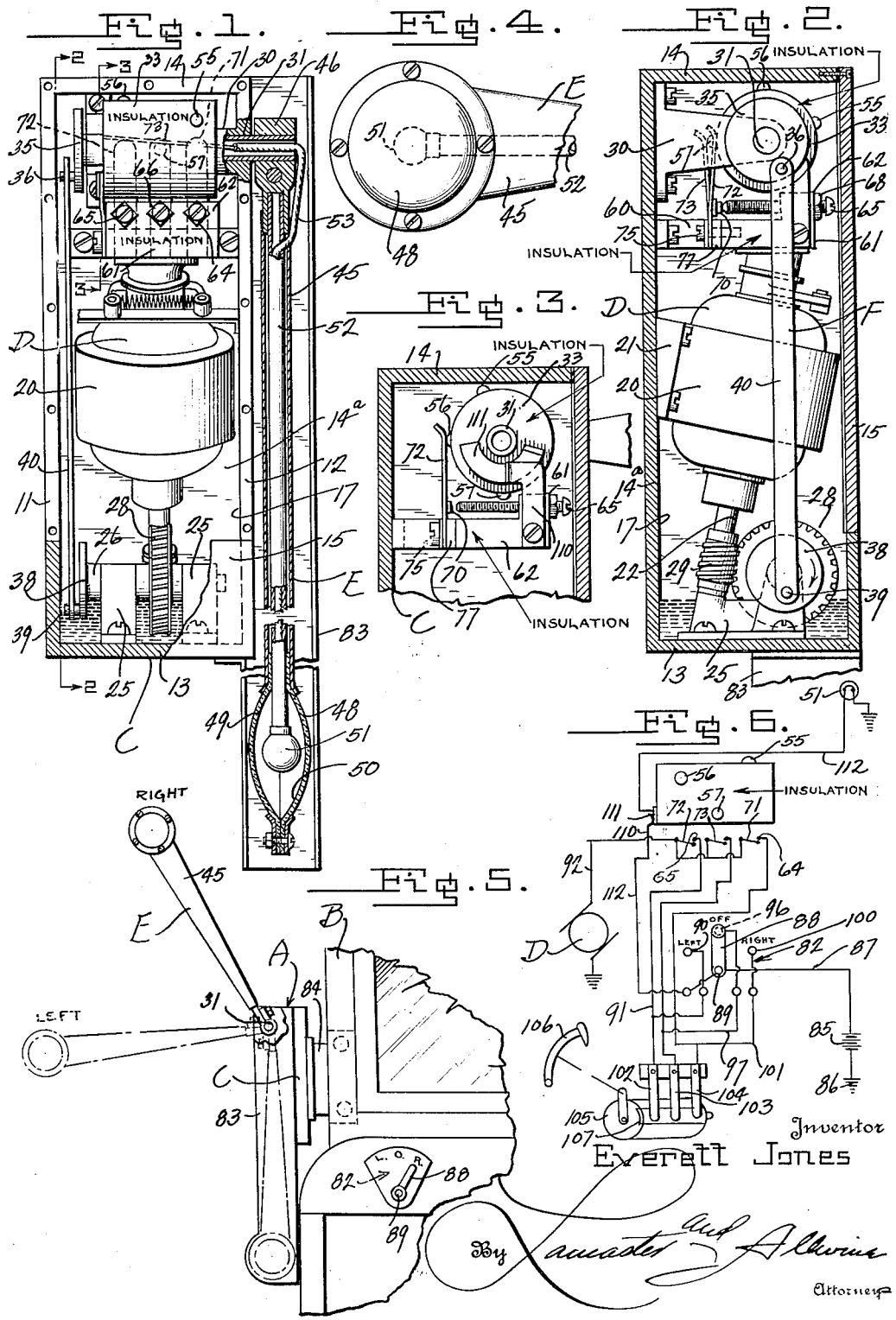

1,787,382

UNITED STATES PATENT OFFICE

EVERETT JONES, OF LEBANON, INDIANA

VEHICLE SIGNAL

Application filed June 15, 1925. Serial No. 37,373.

This invention relates to improvements in vehicle signals.

The primary object of this invention is the provision of an electrically operated vehicle signal, which may be used in connection with vehicle operation to signal in accurate manner the contemplated movement of the vehicle.

A further object of this invention is the provision of a relatively simple and compact type of electrically operated vehicle signal, which embodies novel features of switch operation, by means of which the same may efficiently signal for stopping, right turns, left turns, and be normally maintained in an operative position and out of signalling position.

Other objects and advantages of the invention will be apparent during the course of the following detailed description.

In the accompanying drawing, forming a part of this specification, and wherein similar reference characters designate corresponding parts throughout the several views, Figure 1 is a cross sectional view taken thru the improved vehicle signal, showing the same in an inoperative position.

Figure 2 is a transverse sectional view taken thru the vehicle signal substantially on the line 2—2 of Figure 1.

Figure 3 is a fragmentary cross sectional view taken substantially on the line 3—3 of Figure 1, although showing a different operating position of parts than that illustrated in Figure 1.

Figure 4 is a fragmentary end elevation of the signalling arm of the vehicle signal.

Figure 5 is a rear elevation of the vehicle signal, showing the attachment of the same to a vehicle.

Figure 6 is a diagrammatic representation of the switch and other operating features of the invention.

In the drawing, wherein for the purpose of illustration is shown only a preferred embodiment of this invention, the letter A may generally designate the vehicle signal, adapted for attachment upon a vehicle B. The vehicle signal A may comprise a casing C; motor D; semaphore E; and means F between the motor D and semaphore E for moving the latter; the means F including novel circuit maker and breaker means to control the effectiveness of the motor D in the operation of the semaphore E, for predetermined signalling.

The casing C is preferably formed to provide a front wall 11; rear wall 12; bottom wall 13; top wall 14; inner side wall 14ª; and a detachable cover plate 15 forming the opposite or outside side wall. The casing is vertically elongated, providing the compartment 17 therein, within which the motor D is supported by means of a bracket 20 attached as at 21 to the facing side wall 14ª, so that the shaft 22 of the motor extends at an acute angle to the vertical; the motor D being positioned between the top and bottom walls, substantially midway in the compartment.

In the lower portion of the compartment 17, brackets 25 support a horizontal shaft 26, and this horizontal shaft between the brackets 25 is preferably provided with a worm gear 28, in meshing relation with a worm 29 keyed on the lower end of the motor shaft 22. The worm and worm gear 28 and 29 preferably operate in an oil bath, as is illustrated in the drawings, and to this end the casing C may be suitably formed to retain the oil, as is illustrated in Figure 2 of the drawings.

Upwardly in the casing compartment 17, brackets 30 support a horizontal shaft 31, and keyed on this shaft 31 is a cylinder 33 of insulation material, which is an important part of the circuit maker and breaker arrangement to be subsequently described. The shaft 31 is hollow, and at the end of the same is spaced from the rear wall 11, and there is provided with a crank comprising a disc 35 rigid with the shaft 31, and a crank pin 36 eccentric upon the disc 35 with respect to the axis of the shaft 31.

The means F also includes a crank for the shaft 26, which comprises a disc 38 having a crank pin 39 eccentric thereon. A connecting rod or link 40 is fixedly connected between the crank pins 36 and 39, for operation of the shaft 31 by reason of operation of the shaft 26 by the motor D. An important feature of the invention is the fact that the throw of the crank of the shaft 26 is less than the throw of the crank of the shaft 31, so that by reason of the connecting means F, incident to revolution of the shaft 26, the shaft 31 and its drum 33 will only be oscillated thru an arc of substantially 135°. Thus, for each revolution of the shaft 26, the means F will cause an arcuate movement of the shaft 31 thru an arc of 135°, as can readily be understood.

The semaphore E is preferably of tubular material, and includes the tubular casing 45, which at one end thereof is provided with means 46 to key the same to the shaft 31, which extends laterally thru the rear wall 12 of the casing C. The tubular casing 45 at its free end is substantially ring-shaped, for detachably receiving oppositely disposed concavo-convex lenses 48 and 49, which are spaced to provide a bolt receiving compartment 50 within which the electric light bulb or lamp 51 is disposed. The casing 45 of the semaphore E is provided with a tube 52 therethrough, which receives the conducting wire 53 leading from the bulb 51 towards the pivoted end of the arm, and then thru the tubular shaft 31, for connection to the segmental contact 111 carried by the insulation cylinder 33.

In connection with the circuit maker and breaker means associated with operation of the vehicle signal, a detachable bracket 60 is provided for supporting an insulation terminal screw support 61 in the housing compartment 17, just below the insulation cylinder 33; this insulation block 61 being provided with an upstanding portion 62 which adjustably receives three horizontally positioned terminal screws 64, 65 and 66. These terminal screws 64, 65 and 66 are provided with lock nuts 68 to hold them in a desired adjustment, and the ends of said terminal screws provide contact points for cooperation against the contact lugs 70 of spring arms or contacts 71, 72, and 73, with which the screws 64, 65 and 66 respectively are associated. The spring arms 71, 72, and 73 are connected by means of screws or bolts 75 to the insulation block 61, a conducting strip 77 being provided for receiving the flexible spring arms 71, 72 and 73 thereagainst, to place them in a conducting relation, for a purpose which will subsequently be described. It is to be noted that these flexible arms are not grounded on the casing C, and that their upper ends 80 are arcuated, for cooperation with contact lugs 55, 56, and 57 of the insulation cylinder 33.

The semaphore E when inoperative is positioned within a vertically disposed casing 83 which is provided therefor at the rear wall of the casing C, one side of which is open to permit the swinging of the semaphore E to an angle of about 135°, to assume the positions illustrated in Figure 5 of the drawings. The casing C may be mounted by a bracket 84 upon the windshield of the vehicle B, and the switch construction 82 for operation of the circuits may be carried on the dash of the vehicle B, as illustrated in Figure 5.

Referring now to the operation of the circuits and parts of the vehicle signal with particular reference to the diagrammatic view illustrated in Figure 6, the battery 85 is grounded at 86, and the current flows from the battery 85 thru a conductor 87 to the switch arm 88 of the switch mechanism 82, which is pivoted at 89. If it is desired to signal a left turn, the arm 88 is moved to the contact 90 and the current flows therethrough into the wire 91, and into the terminal screw 65. As the tendency of the contact arm 72 is to force its contact lug 70 against the end of the screw 65, the current will pass from the terminal screw 65 into the contact arm 72, and then thru the conductor strip 77 by way of a wire 92 into the motor D. This sets the motor D in operation, and the shaft 26 will start to revolve, causing an oscillation of the shaft 31. The shaft 31 moves through an arc of about 90°, from the off position of the vehicle signal A, and which elevates the semaphore E from its casing 83, to the position illustrated by the dot and dash lines in Figure 5 of the drawings, and at this point the contact lug 56 of the insulation cylinder 33 will ride into engagement with the spring arm 72, at its free end 80, causing the same to flex outwardly, to move its contact lug 70 away from the terminal screw 65, and which of course breaks the circuit thru the motor, causing the motor to stop, and the semaphore will thus be in an elevated position to signal to traffic that the driver contemplates a left hand turn of the vehicle. Frictional resistance of parts is sufficient to maintain the semaphore E in the elevated position to which raised.

When it is desired to lower the signal arm or semaphore E, the operator moves the switch arm 88 to the "off" button 96, and this bridges the circuit from the battery 85 thru the arm 88 into a conductor wire 97, which leads to the centrally positioned terminal screw 66, and the circuit is conveyed thru this screw 66, and thru the contact arm 73, into the motor D, causing the latter to rotate and the semaphore arm E is then oscillated until the same approaches its casing 83, and as the same moves into the casing 83 the contact lug 57 of the insulation cylinder 33 will move into engagement with the flexible contact arm 73, forcing the same to flex and move out of conducting engagement with the terminal screw 66, and break the circuit thru the motor D, so that the semaphore E will be positioned in its casing 83.

To signal a right hand turn of the vehicle the operator moves the switch arm 88 to the right contact 100 of the switch 82, and this causes the current to flow thru a conductor 101 to the third terminal screw 64, and as its spring arm 71 engages the said terminal screw, the motor D will be set in operation, as can readily be understood, and the semaphore E will be elevated until the contact lug 55 rides into engagement with the contact arm 71, causing the latter to flex and move out of conducting engagement with the terminal screw 64, breaking the circuit thru the motor D, and holding the semaphore arm E in its elevated position illustrated in Figure 5, to signal a right hand turn of the vehicle. To return the semaphore arm E to an inoperative position the operator needs only to move the switch arm 88 to the off contact 96, and the semaphore arm E will be returned to its casing 83, as above described.

To signal a contemplated "stop" of the vehicle, a novel circuit maker and breaker arrangement has been provided, whereby to continuously cause the semaphore arm E to oscillate, at a predetermined time, by simultaneously placing the battery 85 in conducting relation with all of the conductor wires 91, 97 and 101 at the same time. To this end, conductor strips 102, 103 and 104 are placed respectively in conducting relation with the circuit wires 91, 97 and 101, and which arms or pieces 102, 103 and 104 engage against a roller 105, which may be suitably connected to the brake pedal 106 of the vehicle B, for oscillation or movement thereof. The cylinder 105 may be of insulation, but it is provided with a contact strip 107, which whenever the brake 106 is pushed to apply the brakes of the vehicle, will move into short circuiting engagement with all of the contact pieces 102, 103 and 104, causing the current to flow from the battery 85 thru the switch structure 82, in its off position, and thru all of the terminal screws 64, 65 and 66, for a continuous operation of the motor D, until the brake pedal 106 is released. This signals to the traffic in the rear a contemplated stop.

From the foregoing description of this invention it is apparent that a novel type of vehicle signal has been provided, which is electrically operated, and which may be easily operated to signal any of the approved signalling operations to inform traffic of contemplated movements and stops.

The bulb 51 is illuminated upon elevation of the arm E from its casing 83, by reason of riding of the segment 111 of the cylinder 33 into engagement with the contact arm 110; the latter being connected to the battery 85 by the conductor 112.

Various changes in the shape, size, and arrangement of parts may be made to the form of invention herein shown and described, without departing from the spirit of the invention or the scope of the claim.

I claim:

In a vehicle signal the combination of an elongated casing, a motor supported in the casing, substantially midway of the ends thereof, a shaft transverse to the motor rotatably carried at one end of the casing adjacent to an end of the motor, means connecting said shaft with the motor for rotation thereof, a second shaft transverse to the motor carried by the casing beyond the opposite end of the motor from the first shaft, a signal semaphore carried by the second shaft, and means connecting said shafts whereby the semaphore carrying shaft will be oscillated upon rotation of the first mentioned shaft.

EVERETT JONES.